(12) United States Patent
Kang et al.

(10) Patent No.: US 12,014,667 B2
(45) Date of Patent: Jun. 18, 2024

(54) DISPLAY DEVICE

(71) Applicant: LG Display Co., Ltd., Seoul (KR)

(72) Inventors: Hoon Kang, Goyang-si (KR); Juhoon Jang, Paju-si (KR); Joobong Hyun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/511,255

(22) Filed: Oct. 26, 2021

(65) Prior Publication Data

US 2022/0130318 A1    Apr. 28, 2022

(30) Foreign Application Priority Data

Oct. 27, 2020    (KR) ........................ 10-2020-0140287

(51) Int. Cl.
     *G09G 3/20*      (2006.01)
(52) U.S. Cl.
     CPC ..... *G09G 3/2092* (2013.01); *G09G 2300/023* (2013.01); *G09G 2300/026* (2013.01); *G09G 2300/0439* (2013.01); *G09G 2300/0842* (2013.01); *G09G 2310/08* (2013.01); *G09G 2360/04* (2013.01)
(58) Field of Classification Search
     CPC .......... G09G 3/2092; G09G 2300/023; G09G 2300/026; G09G 2300/0439; G09G 2300/0842; G09G 2310/08; G09G 2360/04; G09G 2300/0426; G09G 2310/0232; G09G 2340/0407; G09G 3/3233; G09G 3/3225; G06F 3/1446; H10K 59/121; H10K 59/12; H10K 59/131
See application file for complete search history.

(56) References Cited

U.S. PATENT DOCUMENTS

| | | | |
|---|---|---|---|
| 9,123,266 B2* | 9/2015 | Bastani | G09F 13/04 |
| 10,338,876 B2* | 7/2019 | Kim | G02F 1/13336 |
| 10,928,635 B1* | 2/2021 | Trail | G02B 6/0023 |
| 10,997,952 B2* | 5/2021 | Ko | G02F 1/13318 |
| 2007/0247518 A1* | 10/2007 | Thomas | H04N 5/74 348/E5.051 |
| 2008/0284677 A1* | 11/2008 | Whitehead | H04N 9/3155 345/1.3 |

(Continued)

FOREIGN PATENT DOCUMENTS

| | | |
|---|---|---|
| KR | 20100000116 A | 1/2010 |
| KR | 20150031623 A | 3/2015 |
| KR | 10-2020-0047862 A | 5/2020 |

*Primary Examiner* — Jose R Soto Lopez
(74) *Attorney, Agent, or Firm* — Seed IP Law Group LLP

(57) ABSTRACT

A display device includes a plurality of segmented display units arranged in a matrix, and a front display unit disposed on the plurality of segmented display units. The front display unit includes a plurality of transmission areas corresponding to main display areas of the plurality of segmented display units, and a supplementation display area corresponding to a separation area between the main display areas of adjacent segmented display units among the plurality of segmented display units. Due to the supplementation display area of the front display unit, the separation area between the main display areas of adjacent segmented display units may be prevented from being visible to a user. Therefore, the display device may realize both a large size screen and a high resolution.

19 Claims, 13 Drawing Sheets

(56) References Cited

U.S. PATENT DOCUMENTS

| | | | |
|---|---|---|---|
| 2013/0176352 A1* | 7/2013 | Watanabe | H05K 7/026 |
| | | | 361/807 |
| 2013/0176623 A1* | 7/2013 | Hajjar | G06F 3/1446 |
| | | | 428/221 |
| 2014/0184472 A1* | 7/2014 | Xia | G06F 3/1446 |
| | | | 345/1.3 |
| 2014/0218971 A1* | 8/2014 | Wu | F21V 33/0052 |
| | | | 362/613 |
| 2015/0002411 A1* | 1/2015 | Hwang | G06F 3/041 |
| | | | 345/173 |
| 2015/0022424 A1* | 1/2015 | Jepsen | G09F 9/3026 |
| | | | 345/1.3 |
| 2015/0091833 A1* | 4/2015 | Wu | G06F 3/0446 |
| | | | 345/173 |
| 2015/0097837 A1* | 4/2015 | Jepsen | G06F 3/1446 |
| | | | 345/428 |
| 2015/0364096 A1* | 12/2015 | Lv | G09G 3/3413 |
| | | | 345/77 |
| 2016/0267860 A1* | 9/2016 | Liu | G09G 3/32 |
| 2016/0327699 A1* | 11/2016 | Li | G02F 1/1335 |
| 2017/0053607 A1* | 2/2017 | Lin | G09G 3/344 |
| 2017/0115722 A1* | 4/2017 | Chen | G09G 5/391 |
| 2017/0249119 A1* | 8/2017 | Ding | G09F 9/33 |
| 2018/0122288 A1* | 5/2018 | Huang | G06F 3/1446 |
| 2019/0355321 A1 | 11/2019 | Suzuki | |
| 2020/0004490 A1* | 1/2020 | Chen | G06F 3/1446 |
| 2020/0082750 A1* | 3/2020 | Lv | G09G 3/2074 |
| 2020/0133614 A1* | 4/2020 | Oh | G06F 3/1446 |
| 2020/0225903 A1* | 7/2020 | Cohen | G09G 5/12 |
| 2020/0295120 A1* | 9/2020 | Bower | H10K 50/865 |
| 2022/0149118 A1* | 5/2022 | Kim | H10K 59/131 |

* cited by examiner

DISPLAY DEVICE

CROSS-REFERENCE TO RELATED APPLICATION

This application claims priority to and the benefit of Korean Patent Application No. 10-2020-0140287, filed in the Republic of Korea on Oct. 27, 2020, the entire contents of which are expressly incorporated herein by reference into the present application.

BACKGROUND

Technical Field

The present disclosure relates to a display device that displays an image.

Description of Related Art

A display device is applied to various electronic devices such as TVs, mobile phones, notebooks and tablets. To this end, research is being conducted to achieve a high resolution, a large size, a thinness, a lightweight, and low power consumption of the display device.

The display device may include a liquid crystal display device (LCD), a plasma display panel device (PDP), a field emission display device (FED), an electrowetting display device (WED), and an electro-luminescence display device (ELDD).

The display device includes a display panel including a display area in which an image is displayed, and a driver board that drives the display panel. The display panel may include two substrates opposite to each other, a polarizing material or a light-emitting material disposed between the two substrates, and a thin-film transistor array that defines a plurality of pixel areas arranged in the display area and drives each pixel area. The thin-film transistor array may include a plurality of thin-film transistors corresponding to a plurality of pixel areas and a plurality of signal lines connected to the plurality of thin-film transistors. The driver board is connected to the signal lines of the thin-film transistor array, and supplies a drive signal corresponding to the image to the plurality of signal lines.

In this connection, each signal line is made of a conductive material, and has a predefined line resistance. The line resistance is proportional to a length of the signal line, and is proportional to the number of pixel areas corresponding to each line.

BRIEF SUMMARY

The inventors of the present disclosure have appreciated that when the display device is implemented at a high resolution, each of the signal lines arranged in a relatively wide display area has a relatively long length. Thus, there is a limit in reducing the line resistance.

In addition, when the display device is implemented at a high resolution, the number of pixel areas connected to each signal line is relatively larger, and thus there is a limit to the reduction of the line resistance.

Accordingly, the inventors have recognized the difficulty of manufacturing a display device which may implement a high resolution and have a large screen at the same time. One or more embodiments have been suggested by the inventors to resolve one or more shortcomings in the related art as well as the problem identified above.

This Brief Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One or more embodiments of the present disclosure provide a display device which may implement a high resolution and have a large screen at the same time.

Technical benefits in accordance with the present disclosure are not limited to the above-mentioned benefits. Other advantages in accordance with the present disclosure as not mentioned above may be understood from following descriptions and more clearly understood from embodiments in accordance with the present disclosure. Further, it will be readily appreciated that the advantages in accordance with the present disclosure may be realized by features and combinations thereof as disclosed in the claims.

An example of the present disclosure provides a display device including a plurality of segmented display units arranged in a matrix, and a front display unit disposed on the plurality of segmented display units.

The front display unit includes a plurality of transmission areas corresponding to main display areas of the plurality of segmented display units, and a supplementation display area corresponding to a separation area between the main display areas of adjacent segmented display units among the plurality of segmented display units.

The supplementation display area of the front display unit implements a lower resolution than the main display area of each segmented display unit implements.

The main display area of each segmented display unit may be visually recognized through the transmission area of the front display unit.

Due to the supplementation display area of the front display unit, the separation area between the main display areas of adjacent segmented display units may be prevented from being visible to a user. Accordingly, the display device does not display an image signal in a divided manner in which the plurality of segmented display units are divided, but displays an image signal in an integral manner, and thus the image signal may be visually recognized by a user in the integral manner.

Therefore, the display device may overcome the limitation of the line resistance and realize both the large size screen and the high resolution.

Each segmented display unit further includes a bottom signal line. The front display unit further include a front signal line. The front signal line may be formed in a pattern different from that of the bottom signal line. Alternatively, a spacing between the front signal lines may vary on a predefined length basis. In this way, Moiré defects due to overlapping between the bottom signal line and the front signal line may be prevented.

The display device according to one embodiment of the present disclosure includes the plurality of segmented display units and the front display unit disposed on the plurality of segmented display units. The front display unit includes the plurality of transmission areas corresponding to the plurality of segmented display units, and the supplementation display area corresponding to the separation area between main display areas of adjacent segmented display units among the plurality of segmented display units.

Accordingly, a plurality of divided images respectively displayed on the plurality of segmented display units may be visually recognized through the transmission areas of the front display unit, while a discontinuation between adjacent ones of the plurality of divided images may be eliminated by the supplementation display area of the front display unit.

As a result, the display device may realize both the high resolution and the large size screen, while preventing deterioration in image quality.

In addition to the effects as described above, specific effects in accordance with the present disclosure will be described together with the detailed description for carrying out the disclosure.

DETAILED DESCRIPTIONS

Figure 1:
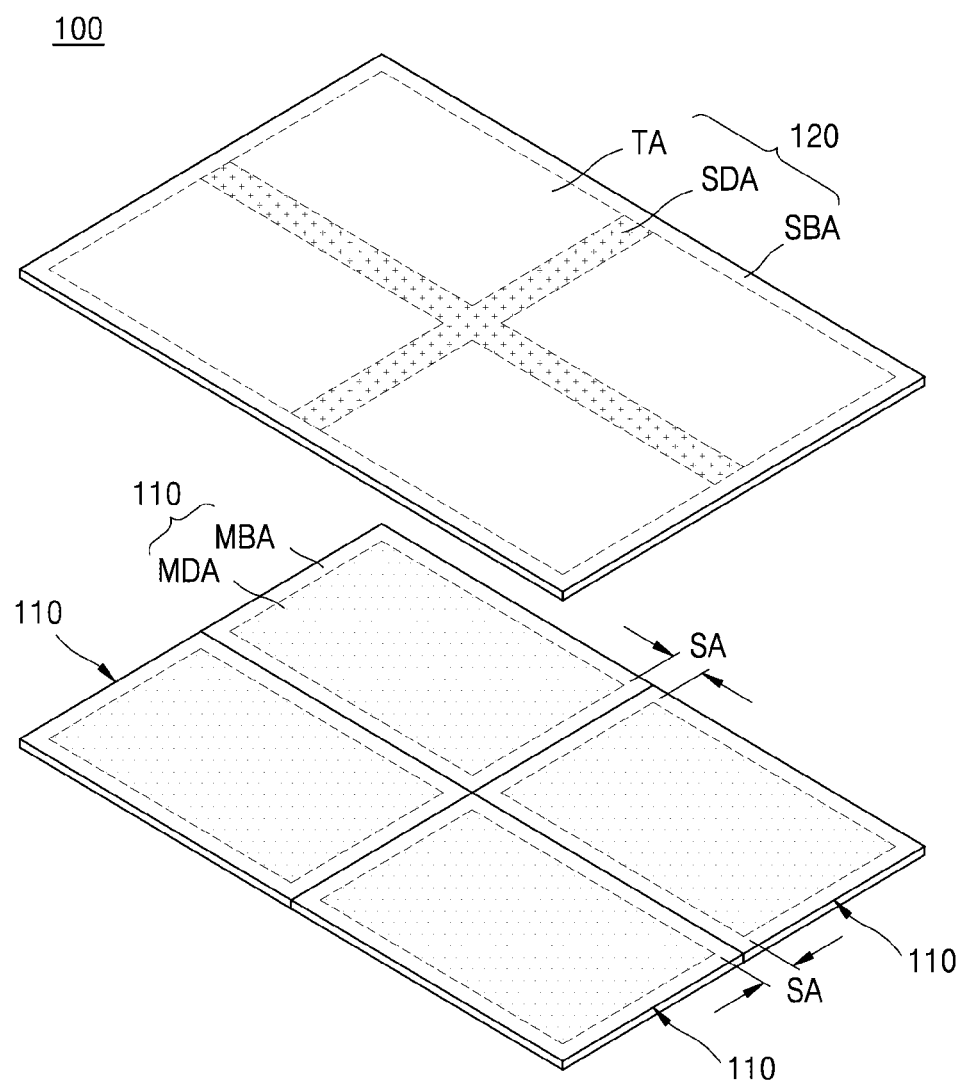
FIG. 1 and FIG. 2 are drawings showing a display device according to one embodiment of the present disclosure.

Advantages and features of the present disclosure, and a method of achieving the Advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the disclosure to those of ordinary skill in the technical field to which the present disclosure belongs.

A shape, a size, a ratio, an angle, a number, etc., disclosed in the drawings for describing the embodiments of the present disclosure are examples, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after," "subsequent to," "before," etc., another event may occur therebetween unless "directly after," "directly subsequent" or "directly before" is not indicated.

It will be understood that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, implementations of a color filter substrate according to the present disclosure and an in-cell touch type display device including the same will be described in detail with reference to the accompanying drawings. In the drawings, the same reference numerals are used to indicate the same or similar elements.

Hereinafter, a display device according to one embodiment of the present disclosure will be described with reference to the attached drawing.

Figure 2:
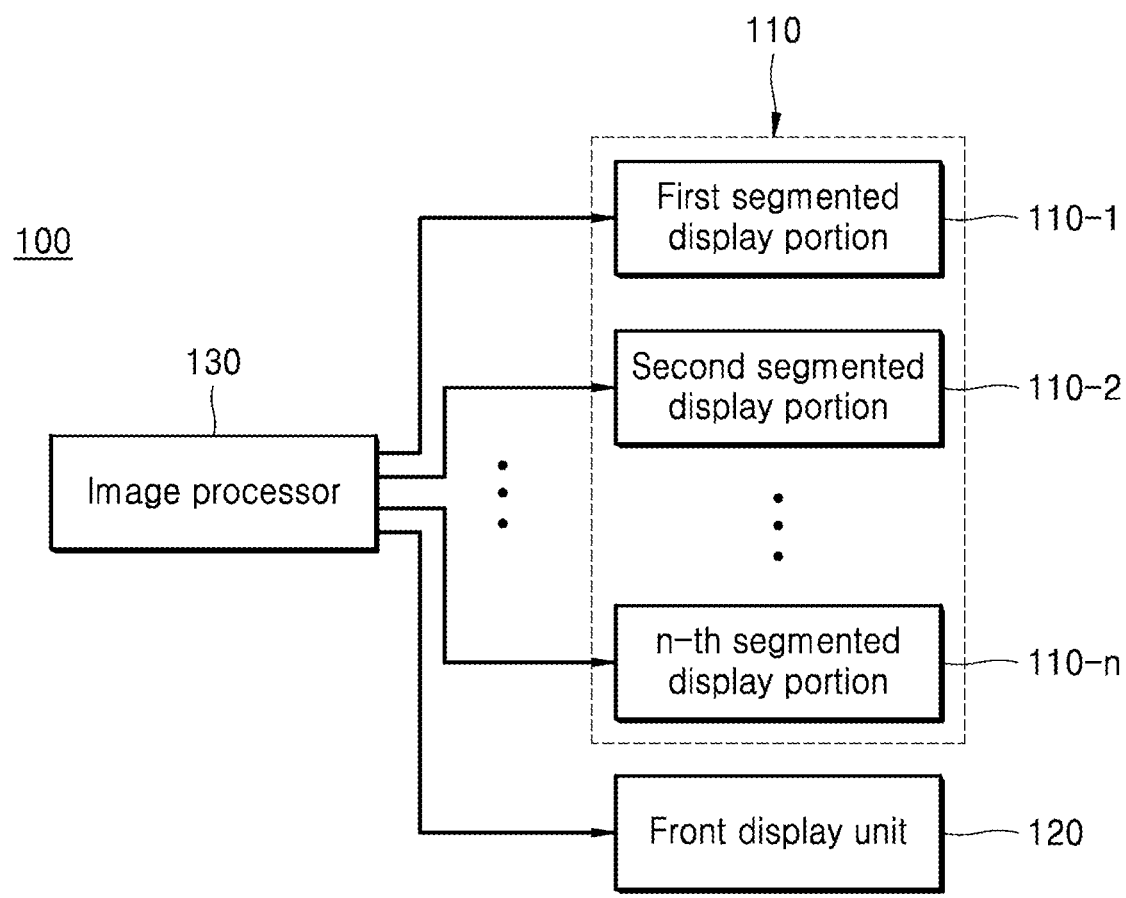
Figure 3:
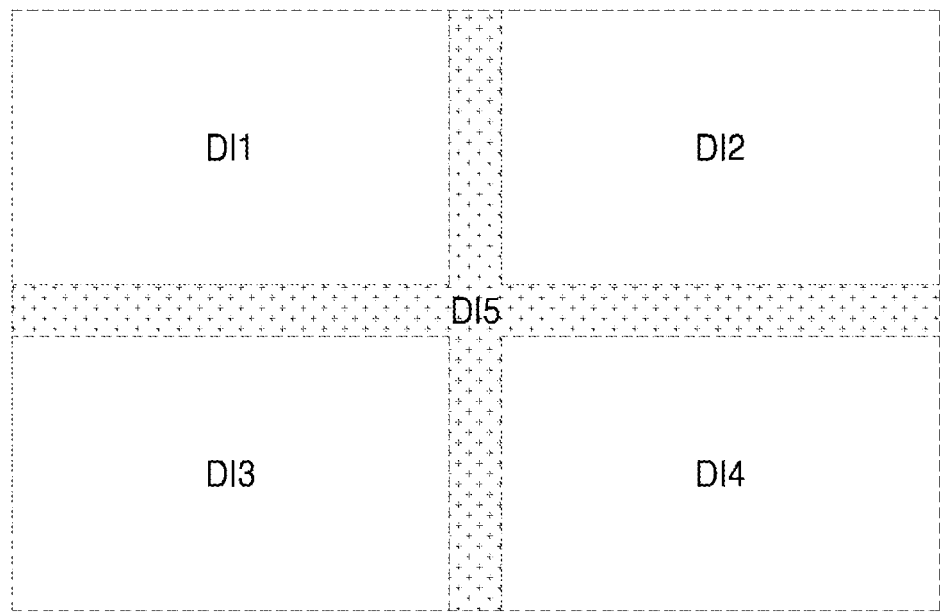
FIG. 3 is a drawing showing an example of a plurality of divided images supplied from an image processor of FIG. 2.
Figure 4:
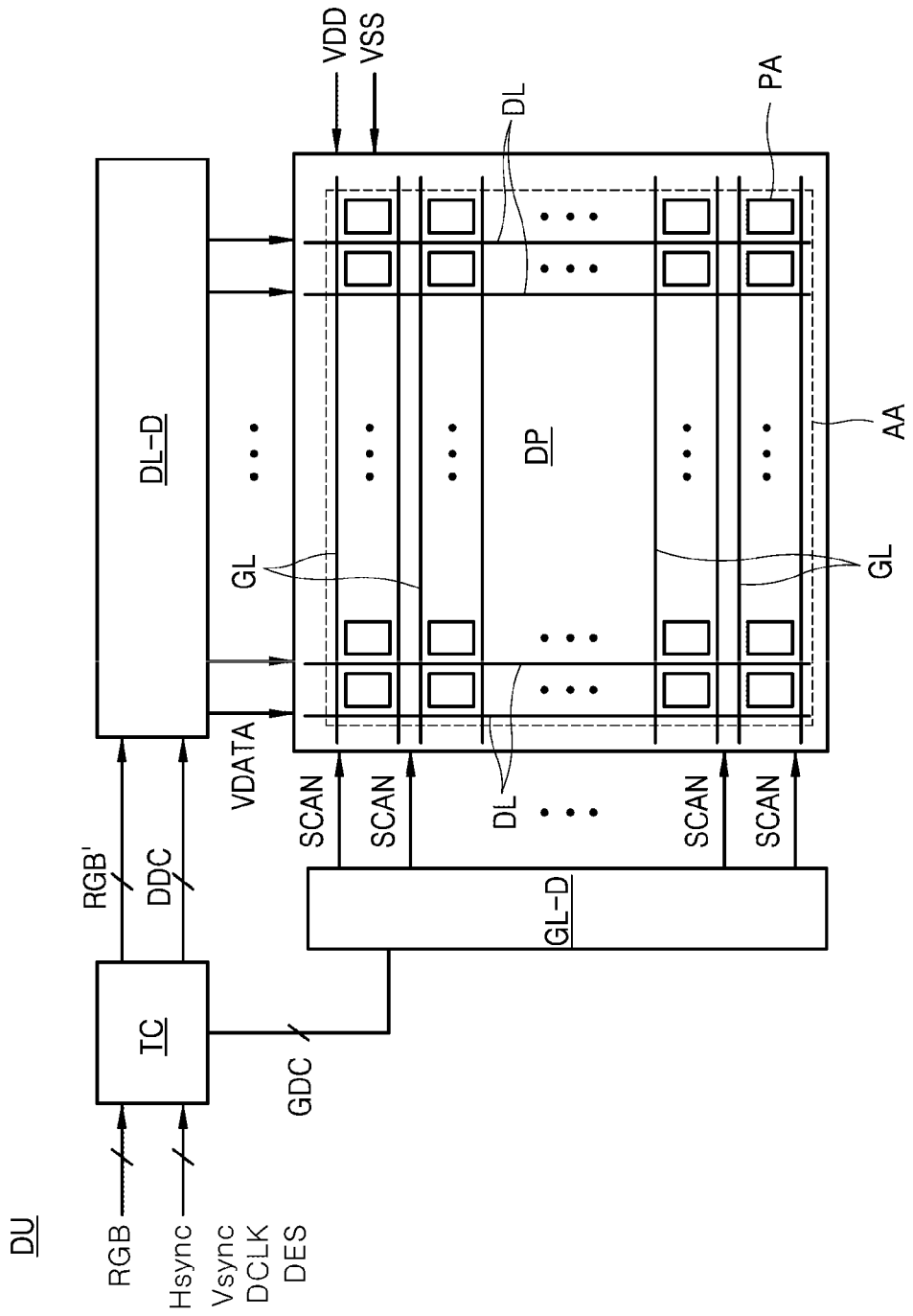
FIG. 4 is a drawing showing each display unit of FIG. 1.
Figure 5:
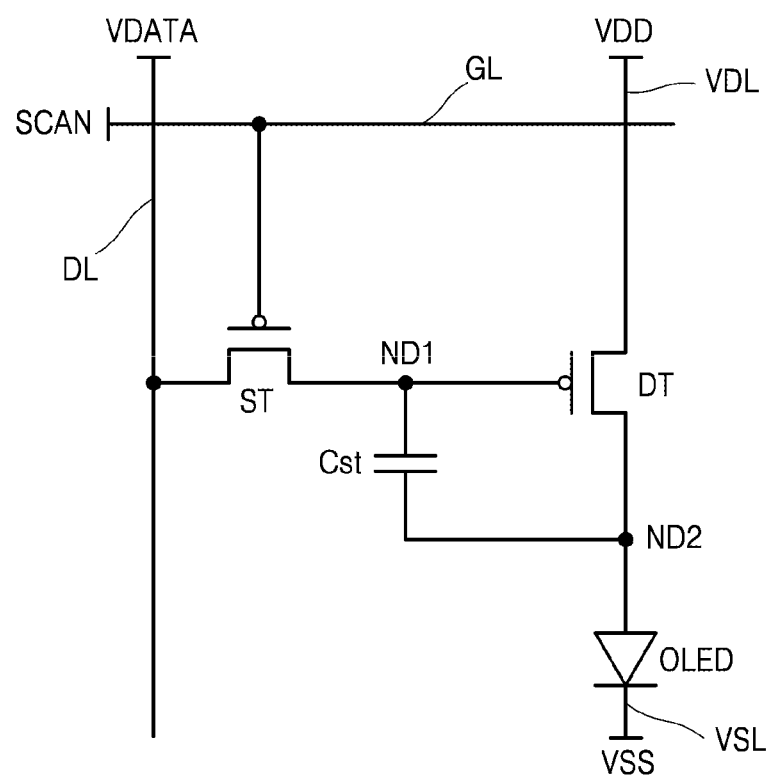
FIG. 5 is a drawing showing an example of an equivalent circuit corresponding to a pixel area of FIG. 4.

FIG. 1 and FIG. 2 are drawings showing a display device according to one embodiment of the present disclosure. FIG. 3 is a drawing showing an example of a plurality of divided images supplied from an image processor of FIG. 2. FIG. 4 is a drawing showing each display unit of FIG. 1. FIG. 5 is a drawing showing an example of an equivalent circuit corresponding to a pixel area of FIG. 4.

As shown in FIG. 1, a display device 100 according to one embodiment of the present disclosure includes a plurality of segmented display units 110 arranged in a matrix, and a front display unit 120 disposed on the plurality of segmented display units 110, and having a dimension corresponding to a total dimension of the plurality of segmented display units 110. The dimension may include width, length, or the like.

The plurality of segmented display units 110 are arranged in a matrix. In one example, as shown in FIG. 1, the plurality of segmented display units 110 may be arranged in a 2×2 (two by two) matrix. However, this is just an example. The plurality of segmented display units 110 may be arranged in a matrix of a×b (where one of a and b is a natural number greater than 1 and the other thereof is a natural number equal to or greater than 1). The number of each of the columns and the rows of the matrix of the plurality of segmented display units 110 may vary such that a shape corresponding to an arrangement of the plurality of segmented display units 110 may vary.

Each of the segmented display units 110 includes a main display area MDA from which light for image display is emitted.

Each segmented display unit 110 may further include a main bezel area MBA disposed adjacent to the main display area MDA. In one embodiment, as shown in FIG. 1, the main bezel area MBA is disposed outside the main display area MDA and surrounds the main display area MDA.

Due to a spacing corresponding to the main bezel areas MBA between adjacent segmented display units 110 among the plurality of segmented display units 110, a predefined separation area SA is defined between the main display areas MDA of two adjacent segmented display units 110 among the plurality of segmented display units 110.

In one example, when the plurality of segmented display units 110 are in close contact with each other, the separation area SA between the main display areas MDA of two adjacent segmented display units 110 corresponds to a sum of the main bezel areas MBA of two adjacent segmented display units 110.

Since no light is emitted from the separation area SA between the main display areas MDA of adjacent segmented display units 110, the plurality of segmented display units 110 may be visually recognized in a form of tiles which may be easily distinguishable. In this case, the images displayed from the plurality of segmented display units 110 may not be recognized in an integral manner, but may be visually recognized in a divided manner, that is, in a divided tiles manner. Thus, there is a limit to improvement of display quality.

To solve this problem, the display device 100 according to one embodiment of the present disclosure includes the front display unit 120 for covering the separation area SA between the main display areas MDAs of the adjacent ones among the plurality of segmented display units 110.

The front display unit 120 are disposed on a top face of the plurality of segmented display units 110. In this connection, a direction toward the top face is a direction in which the light from each segmented display unit 110 is emitted. That is, the light from each segmented display unit 110 is emitted through the front display unit 120 to an outside.

The front display unit 120 may include a plurality of transmission areas TA corresponding to the main display areas MDA of the plurality of segmented display units 110; and the supplementation display area SDA corresponding to the separation area SA between the main display areas MDA of the adjacent segmented display units 110 among the plurality of segmented display units 110.

The supplementation display area SDA emits light for image display, and covers the separation area SA between the main display areas MDA of the segmented display units 110 adjacent to each other among the plurality of segmented display units 110.

In one example, as shown in FIG. 1, when the plurality of segmented display units 110 are arranged in a 2×2 matrix, the supplementation display area SDA may be cross-shaped.

Although not shown separately, when the plurality of segmented display units 110 are arranged in a 1×b matrix, the supplementation display area SDA may be composed of b-1 straight areas which extend in parallel to each other and are spaced apart from each other.

That is, the supplementation display area SDA may be implemented in any form as long as the supplementation display area SDA covers the separation area SA between the main display areas MDA of the adjacent segmented display units 110 among the plurality of segmented display units 110.

Due to the supplementation display area SDA of the front display unit 120, the separation area SA between the main display areas MDA of the adjacent segmented display units 110 among the plurality of segmented display units 110 may not be visible to an external user.

The plurality of transmission areas TA respectively overlap the main display areas MDA of the plurality of segmented display units 110. That is, the number of transmission areas TAs included in the front display unit 120 is equal to the number of the segmented display units 110.

Each transmission area TA is intended for transmitting therethrough light emitted from the main display area MDA of each of the segmented display units 110.

As described above, the display device 100 according to one embodiment of the present disclosure includes the front display unit 120 disposed on a top face of the plurality of segmented display units 110. The front display unit 120 may transmit therethrough the light emitted from the plurality of segmented display units 110 arranged in a matrix, and may cover the separation area SA between the main display areas MDA of adjacent segmented display units 110. That is, each of the plurality of segmented display units 110 may display each of the divided images in each main display area MDA thereof. The front display unit 120 may display an image corresponding to the gap between the divided images in the supplementation display area SDA, such that the divided images may be displayed in an integral form rather than in a form of divided tiles.

Since the front display unit 120 correspond to a combination of the plurality of segmented display units 110, each segmented display units 110 has a size smaller than that of the front display unit 120. Accordingly, even when the segmented display unit 110 implements a higher resolution than the front display unit 120 implements, the segmented display unit 110 may be less affected by a problem resulting from the line resistance.

Since the front display unit 120 are larger than each of the segmented display units 110, there is a limit to implement the high resolution due to the line resistance. That is, the supplementation display area SDA of the front display unit 120 may implement a lower resolution than the main display area MDA of the segmented display units 110 may implement.

However, the supplementation display area SDA of the front display unit 120 is intended to display an image at the gap between the divided images respectively displayed on the main display areas MDA of neighboring segmented display units 110. Thus, the fact that the supplementation display area SDA of the front display unit 120 implements the lower resolution than the main display area MDA implements may not be easily recognized by the user.

Therefore, the display device 100 according to one embodiment of the present disclosure may implement high resolution for larger sized screen. Therefore, there is an advantage that an application range thereof may be extended.

In addition, as shown in FIG. 2, the display device 100 according to one embodiment of the present disclosure may further include an image processor 130 that supplies each of the divided image signals to each of the plurality of segmented display units 110 and the front display unit 120.

The image processor 130 may generate a plurality of divided image signals corresponding to the plurality of segmented display units 110 (including a first segmented display portion 110-1, a second segmented display portion 110-2, . . . , a n-th segmented display portion 110-n, where n is a natural number) and the front display unit 120, based on an external image signal.

That is, the image processor 130 may divide the external image signal based on an arrangement of the plurality of segmented display units 110 (110-1, 110-2, . . . , 110-n, where n is a natural number) and the front display unit 120, thereby generating the divided image signals corresponding to the plurality of segmented display units 110 (110-1, 110-2, . . . , 110-n, where n is a natural number) and the front display unit 120.

In one example, as shown in FIG. 1, when the display device 100 includes four segmented display units 110 arranged in a 2×2 matrix, the image processor 130 may generate five divided image signals corresponding to the four segmented display units 110 and a single front display unit 120.

That is, as shown in FIG. 3, the image processor 130 of the display device 100 shown in FIG. 2 may divide the external image signal IMAGE based on the arrangement of the four segmented display units 110 (110-1, 110-2 110-3, and 110-4) and the front display unit 120 to generate first to fourth divided image signals DI (DI1, DI2, DI3, and DI4) corresponding to the four main display areas MDA of the four segmented display units 110 arranged in a 2×2 matrix, and a fifth divided image signal DI5 corresponding to the supplementation display area SDA of the front display unit 120.

Thus, the plurality of segmented display units 110 may respectively display the first to fourth divided image signals DI1, DI2, DI3, and DI4 in main display areas MDA thereof, while the front display unit 120 may display the fifth divided image signal DI5 in the supplementation display area SDA thereof. In this way, the external image signal IMAGE may be displayed in an integral form.

In one example, each of the plurality of segmented display units 110 and the front display unit 120 provided in the display device 100 may include a display panel and a driver driving the display panel.

That is, as shown in FIG. 4, each display unit DU (110 and 120 of FIGS. 1 and 2) includes a display panel DP including signal lines GL and DL defining a plurality of pixel areas PA in a display area AA, and drivers TC, GL-D, and DL-D that supplies drive signals to the signal lines GL and DL of the display panel.

Each pixel area PA of the display panel DP emits light corresponding to one color. Two or more pixel area PAs that are adjacent to each other and correspond to different colors among the plurality of pixel area PAs may constitute a unit pixel that emits light of various colors. That is, the unit pixel may display various colors via a combination of light beams emitted from two or more pixel areas PAs that implement a single unit pixel and are adjacent to each other.

The display panel DP includes a gate line GL supplying a scan signal SCAN to select a horizontal line to record a data signal VDATA therein, and a data line DL supplying a data signal VDATA corresponding to a luminance of each pixel area PA. The horizontal line is composed of pixel areas arranged in a line in a horizontal direction among a plurality of pixel area PAs.

In addition, when the display panel DP has a structure including a plurality of light-emitting elements corresponding to a plurality of pixel area PAs, the display panel DP may further include first and second driving power lines (VDL and VSL in FIG. 3) for respectively supplying first and second driving powers VDD and VSS for driving the light-emitting element.

The drivers TC, GL-D, and DL-D may include a gate line driver GL-D that supplies the scan signal SCAN to the gate line GL of the display panel DP, a data line driver DL-D supplying the data signal VDATA to the data line DL of the display panel DP; and a timing controller TC for controlling operation timings of the gate line driver GL-D and the data line driver DL-D.

The timing controller TC may rearrange digital video data RGB input from an outside based on the resolution of the display area AA, and supply the rearranged digital video data RGB' to the data line driver DL-D.

The timing controller TC may supply a data control signal DDC for controlling the operation timing of the data line driver DL-D, and a gate control signal GDC to control the operation timing of the gate line driver GL-D, based on timing signals such as a vertical synchronization signal Vsync, a horizontal synchronization signal Hsync, a dot clock signal DCLK and a data enable signal DES.

The gate line driver GL-D sequentially supplies the scan signal SCAN to a plurality of gate line GLs corresponding to a plurality of horizontal lines during one frame period based on the gate control signal GDC.

That is, the gate line driver GL-D supplies the scan signal SCAN to the gate line GL corresponding to each horizontal line during each horizontal period corresponding to each horizontal line during one frame period.

The data line driver DL-D converts the rearranged digital video data RGB' into an analog data voltage based on the data control signal DDC. The data line driver DL-D supplies, to the data line DL, the data signal VDATA corresponding to each of the pixel areas PAs of the horizontal line to which the scan signal SCAN is supplied during each horizontal period, based on the rearranged digital video data RGB'.

FIG. 5 shows an example of an equivalent circuit to each pixel area PA when the display panel DP includes a plurality of light-emitting elements corresponding to a plurality of pixel areas PAs.

As shown in FIG. 5, each pixel area PA may include an organic light-emitting element OLED and a pixel circuit DT, ST, and Cst that supplies a drive signal to the organic light-emitting element OLED.

The pixel circuit may include a driving thin-film transistor DT, a switching thin-film transistor ST and a storage capacitor Cst. However, this is just an example. Alternatively, each pixel area PA may include the pixel circuit, and may further include a compensation circuit (not shown) to compensate for deterioration of at least one of the driving thin-film transistor DT or the organic light-emitting element OLED. The compensation circuit may include at least one thin-film transistor for a sensing function or for supplying a reference power (not shown).

The organic light-emitting element OLED includes first and second electrodes, that is, an anode and a cathode, and a light-emitting layer disposed between the first and second electrodes. The light-emitting layer emits light based on a driving current between the first and second electrodes. The organic light-emitting element OLED may have a multi-layered stack structure including two or more light-emitting layers.

The driving thin-film transistor DT may be connected in series to the organic light-emitting element OLED and may be disposed between the first driving power line VDL supplying the first driving power VDD and the second driving power line VSL supplying the second driving power VSS of a potential lower than that of the first driving power VDD.

The switching thin-film transistor ST may be disposed between and connected to the data line DL supplying the data signal VDATA of each pixel area PA and a gate electrode of the driving thin-film transistor DT.

The storage capacitor Cst may be disposed between a first node ND1 and a second node ND2. The first node ND1 refers to a contact point between the switching thin-film transistor ST and the gate electrode of the driving thin-film transistor DT. The second node ND2 refers to a contact point between the driving thin-film transistor DT and the organic light-emitting element OLED.

In this pixel circuit, the switching thin-film transistor ST is turned on based on the scan signal SCAN of the gate line GL. The turned-on switching thin-film transistor ST may allow the data signal VDATA of the data line DL to be supplied to the gate electrode of the driving thin-film transistor DT connected to the first node ND1 and to the storage capacitor Cst.

The storage capacitor Cst is charged with the data signal VDATA supplied to the first node ND1.

The driving thin-film transistor DT is turned on based on the data signal VDATA supplied to the first node ND1 and a charged voltage of the storage capacitor Cst. In this connection, the turned-on driving thin-film transistor DT may allow the driving current corresponding to the data signal VDATA to be supplied to the second node ND2, that is, the organic light-emitting element OLED.

Next, with reference to FIG. 6 to FIG. 15, the segmented display units 110 and the front display unit 120 provided in the display device 100 according to one embodiment of the present disclosure will be described.

Figure 6:
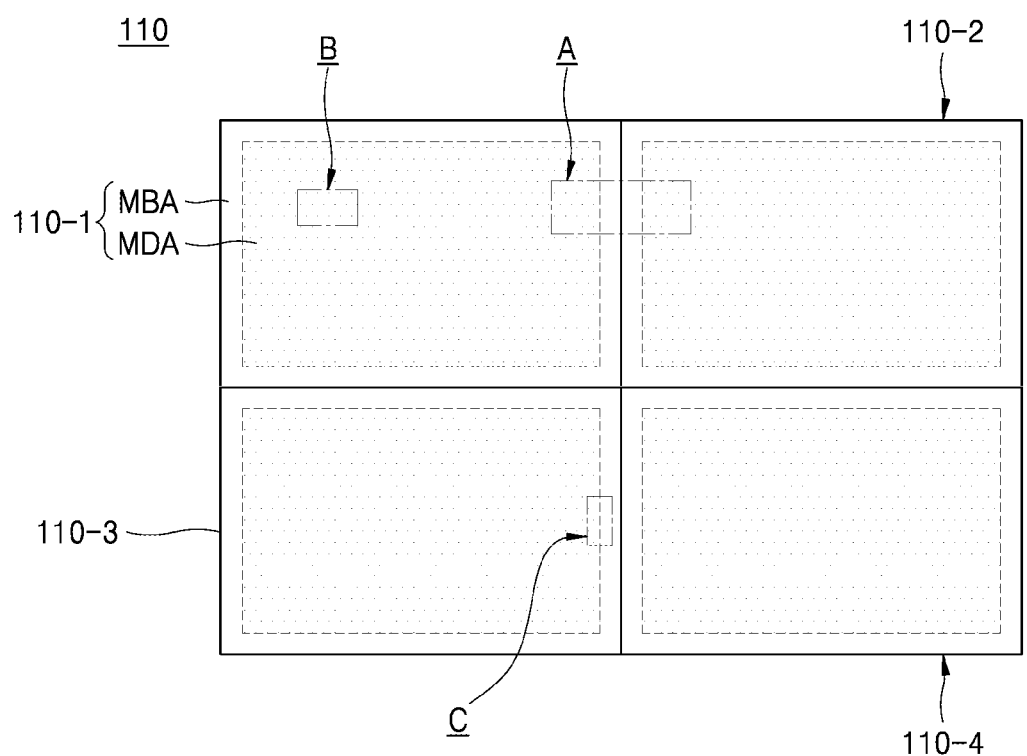
FIG. 6 is a drawing showing an example of the plurality of segmented display units of FIG. 1.
Figure 7:
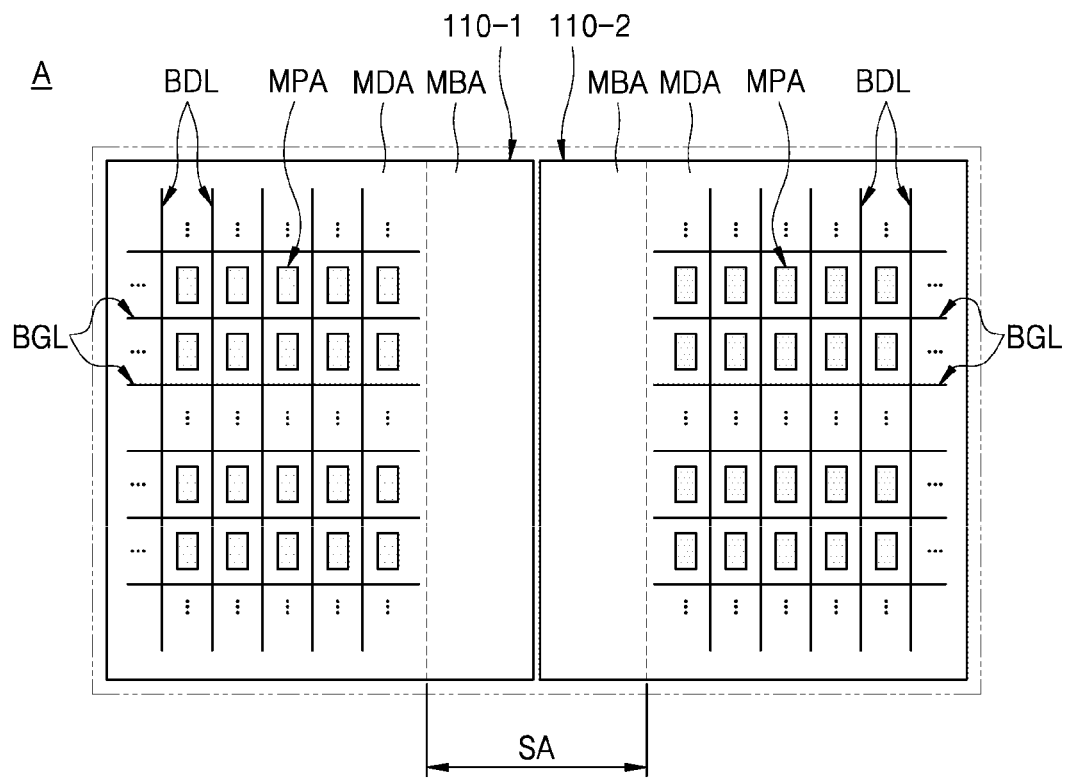
FIG. 7 is a drawing showing an example of a portion A of FIG. 6.
Figure 8:
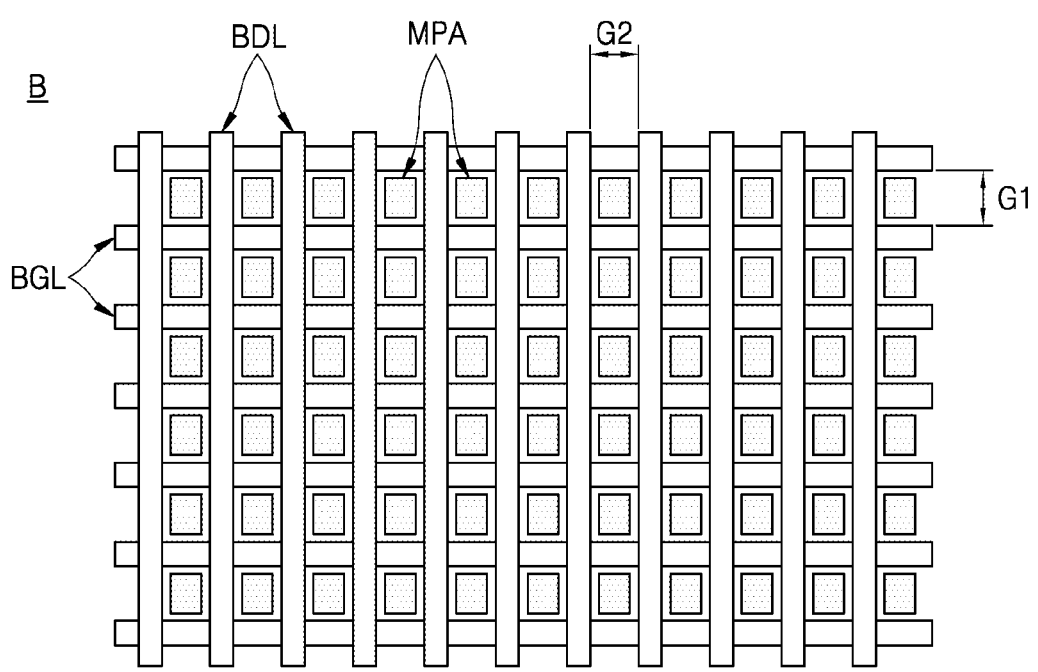
FIG. 8 is a drawing showing an example of a portion B in FIG. 6.

FIG. 6 is a drawing showing an example of the plurality of segmented display units of FIG. 1. FIG. 7 is a drawing showing an example of a portion A of FIG. 6. FIG. 8 is a drawing showing an example of a portion B in FIG. 6.

As shown in FIG. 6, the plurality of segmented display units 110-1, 110-2, 110-3, and 110-4 have the same size. In this connection, the sizes thereof may be the same in an error range in which a difference therebetween is not intuitively recognized by the user.

The plurality of segmented display units 110-1, 110-2, 110-3, and 110-4 are arranged in a matrix or side by side.

Edges of two adjacent segmented display units among the plurality of segmented display units 110-1, 110-2, 110-3, and 110-4 may be spaced apart from each other by a micro spacing. In this connection, the micro spacing is within a range such that the spacing may not be easily and intuitively detected by the user. In one example, the micro spacing may be within a range smaller than a width of the main bezel area MBA, or within a range smaller than a width of the pixel area PA.

Alternatively, edges of two adjacent segmented display units among the plurality of segmented display units 110-1, 110-2, 110-3, and 110-4 may contact each other. In this connection, the adjacent segmented display units 110-1, 110-2, 110-3, and 110-4 may be fixed to each other via adhesive means or the like. In this way, when vibration occurs due to movement or installation of the display device 100, a physical shock between the adjacent segmented display units may be reduced.

FIG. 6 shows the first, second, third, and fourth segmented display units 110-1, 110-2, 110-3, and 110-4 arranged in a 2×2 matrix. However, this is only an example. An arrangement of the plurality of segmented display units 110-1, 110-2, 110-3, and 110-4 may be applied in a manner corresponding to various planar shapes of the front display unit 120.

Each of the plurality of segmented display units 110-1, 110-2, 110-3, and 110-4 may include the main display area MDA from which light for image display is emitted, and the main bezel area MBA outside the main display area MDA and surrounding the main display area MDA.

As shown in FIG. 7, each of the segmented display units 110-1 and 110-2 includes a plurality of major pixel areas MPAs arranged in a matrix in the main display area MDA.

The separation area SA between the main display areas MDA of the first and second segmented display units 110-1 and 110-2 adjacent to each other may be equal to a sum of a spacing between the first and second segmented display units 110-1 and 110-2 and a width of the main bezel area MBA of each of the first and second segmented display units 110-1 and 110-2.

Each of the segmented display units 110-1 and 110-2 includes bottom signal lines BGL and BDL for supplying drive signals to the plurality of major pixel area MPAs. That is, each of the segmented display units 110-1 and 110-2 includes a bottom gate line BGL that supplies a scan signal (SCAN of FIG. 3) to the plurality of major pixel area MPAs, and a bottom data line BDL supplying the data signal (VDATA in FIG. 3) to the plurality of major pixel areas MPA.

Each of the bottom signal lines BGL and BDL may extend in a straight line across the main display area MDA.

As shown in FIG. 8, the bottom signal lines (for example, the bottom gate lines BGL) extending in a first direction are arranged and spaced from each other by the same first spacing G1 in a second direction. The bottom signal lines (for example, the bottom data lines BDL) extending in the second direction are arranged and spaced from each other by the same second spacing G2 in the first direction.

Accordingly, the plurality of major pixel areas MPAs arranged in a matrix in the main display area MDA may have the same size.

Figure 9:
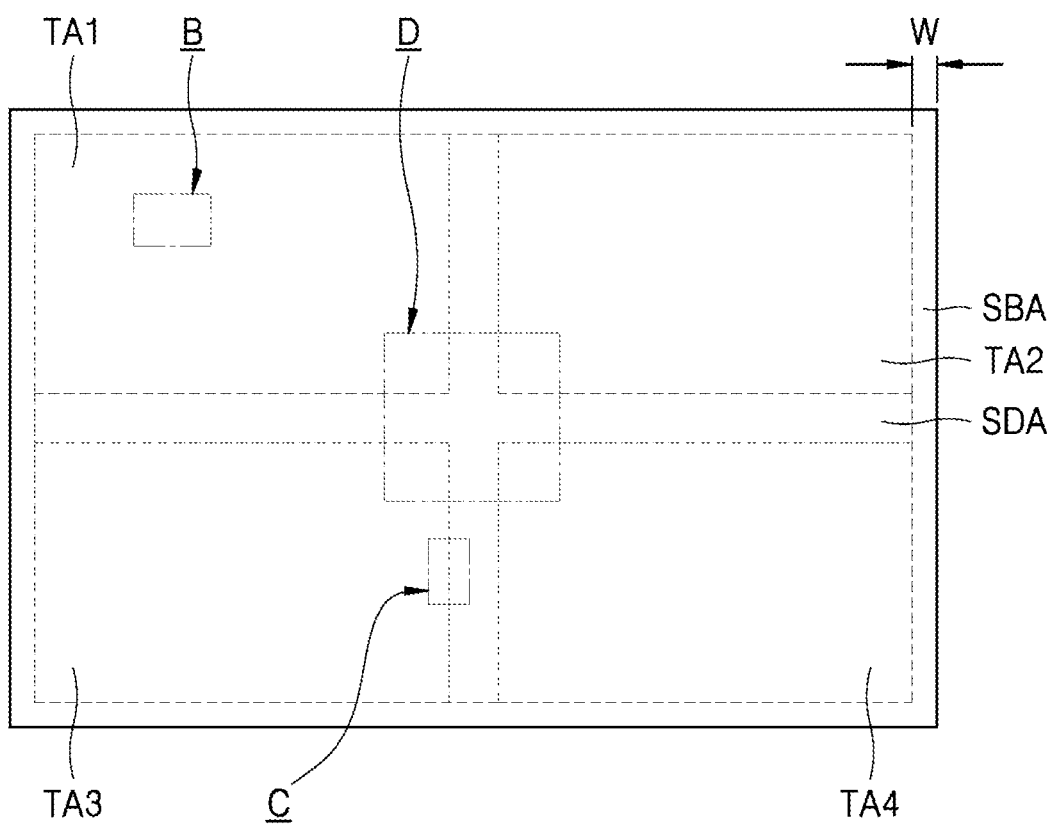
FIG. 9 is a drawing showing an example of a front display unit of FIG. 1.
Figure 10:
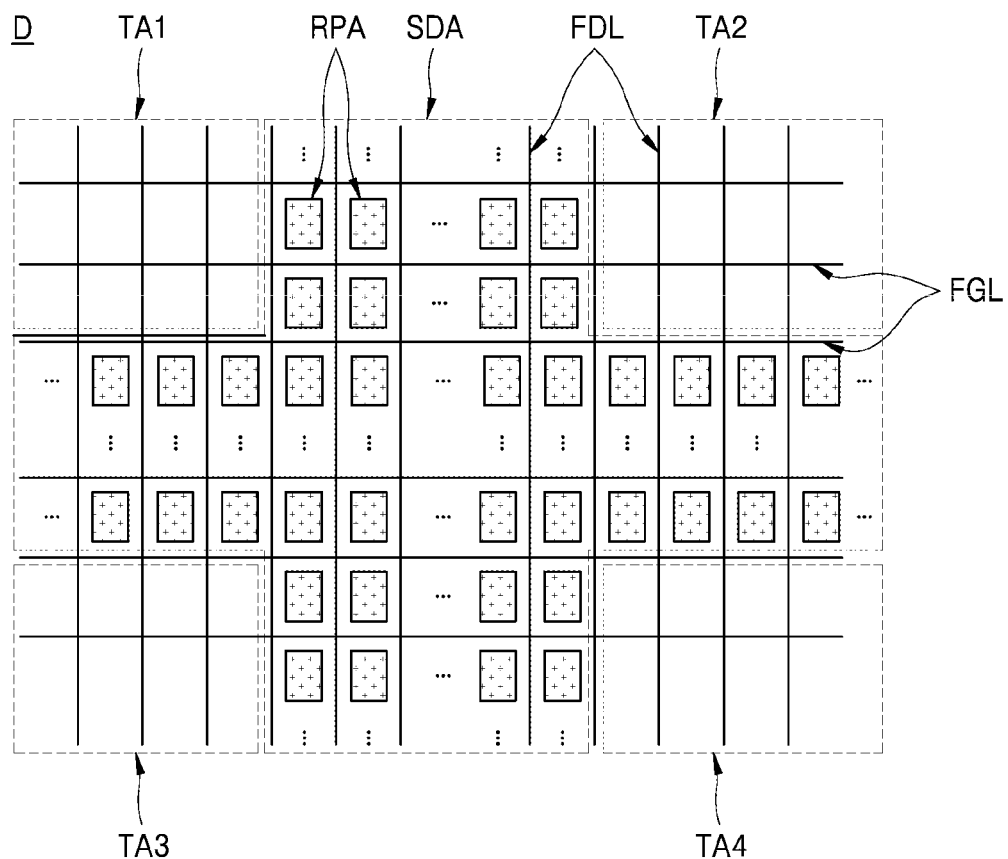
FIG. 10 is a drawing showing a portion of the front display unit corresponding to a D portion of FIG. 9.
Figure 11:
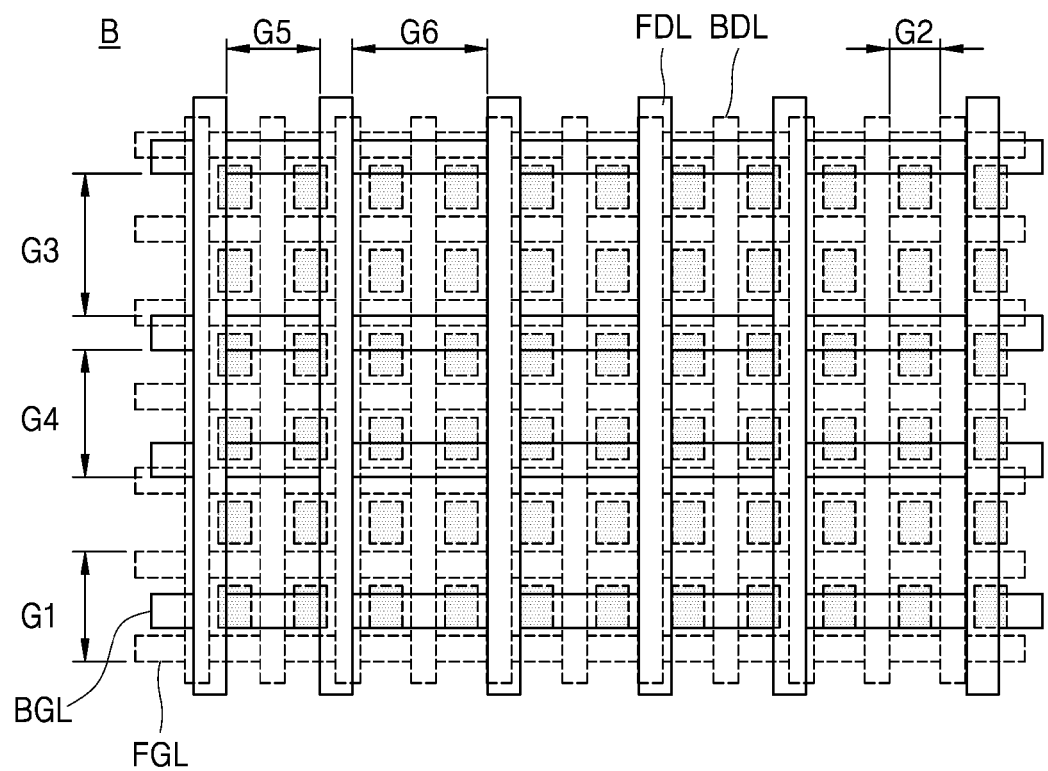
FIG. 11, FIG. 12, and FIG. 13 are drawings showing examples of the portion B in FIG. 6 and FIG. 9.
Figure 12:
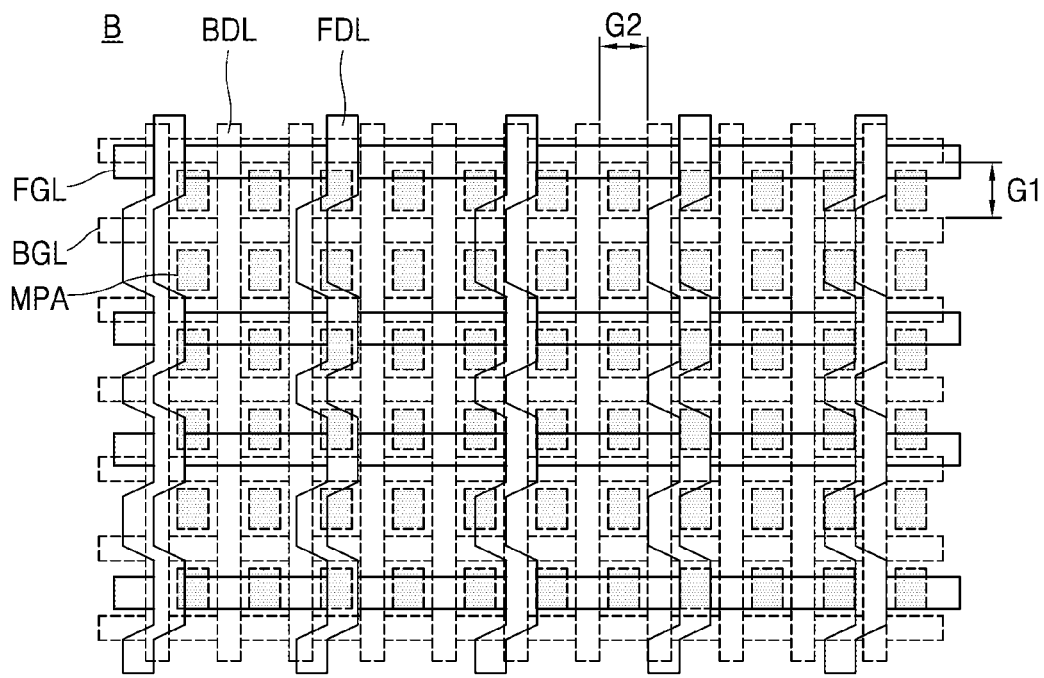
Figure 13:
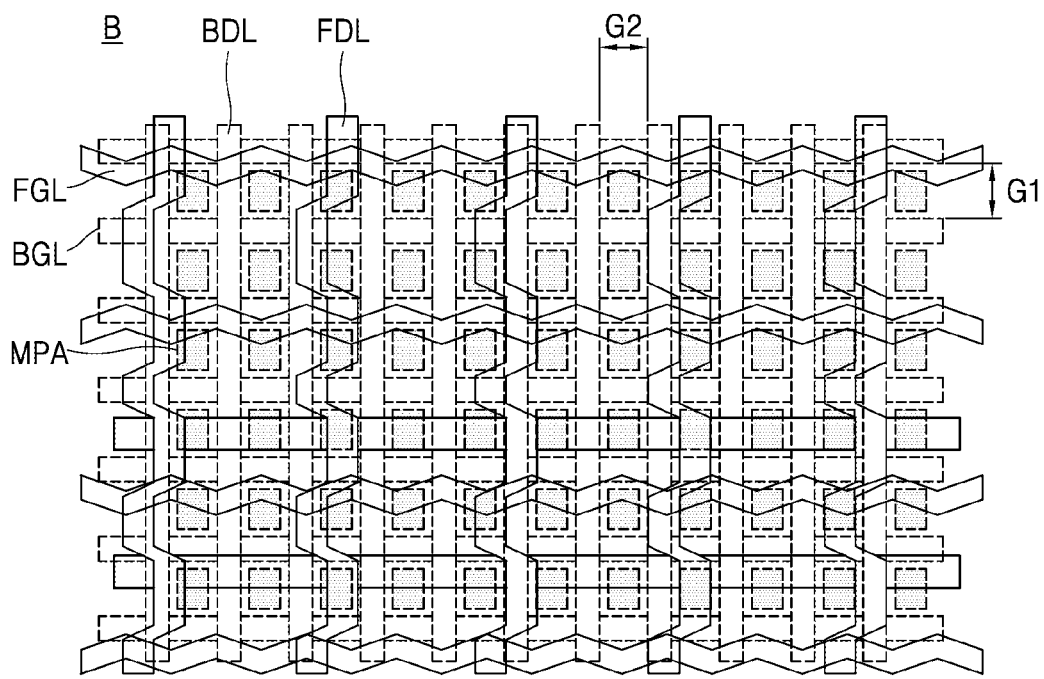
Figure 14:
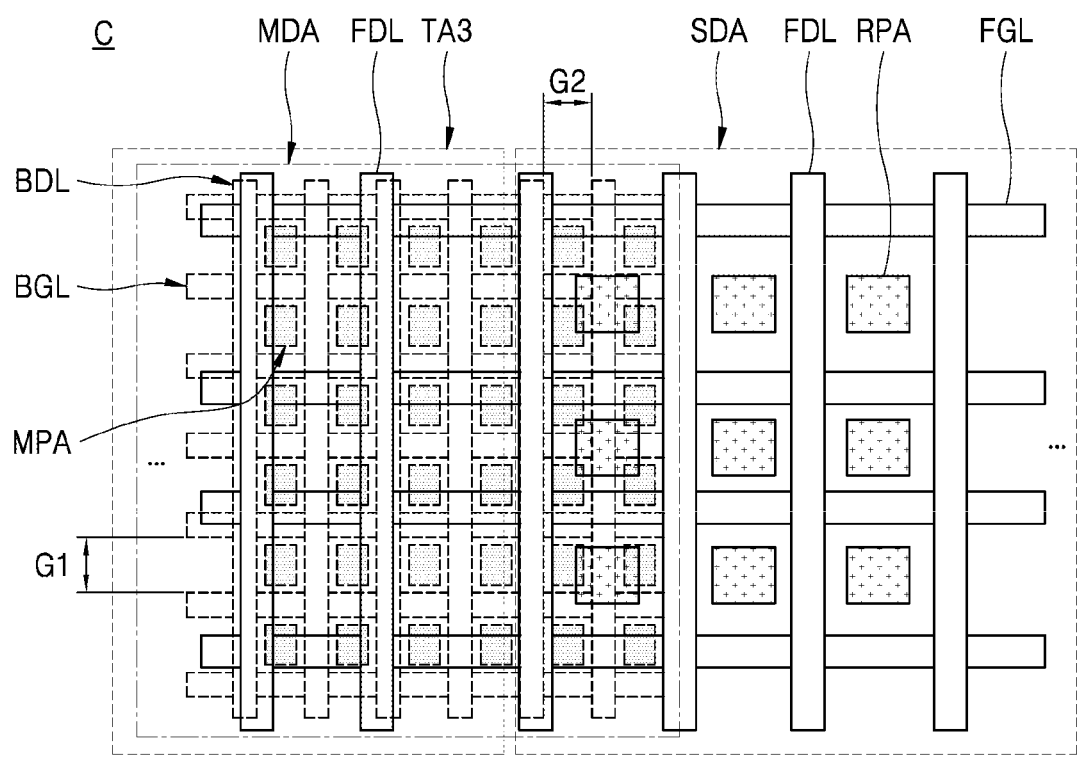
FIGS. 14 and 15 are drawings showing examples of a portion C in FIGS. 6 and 9.
Figure 15:
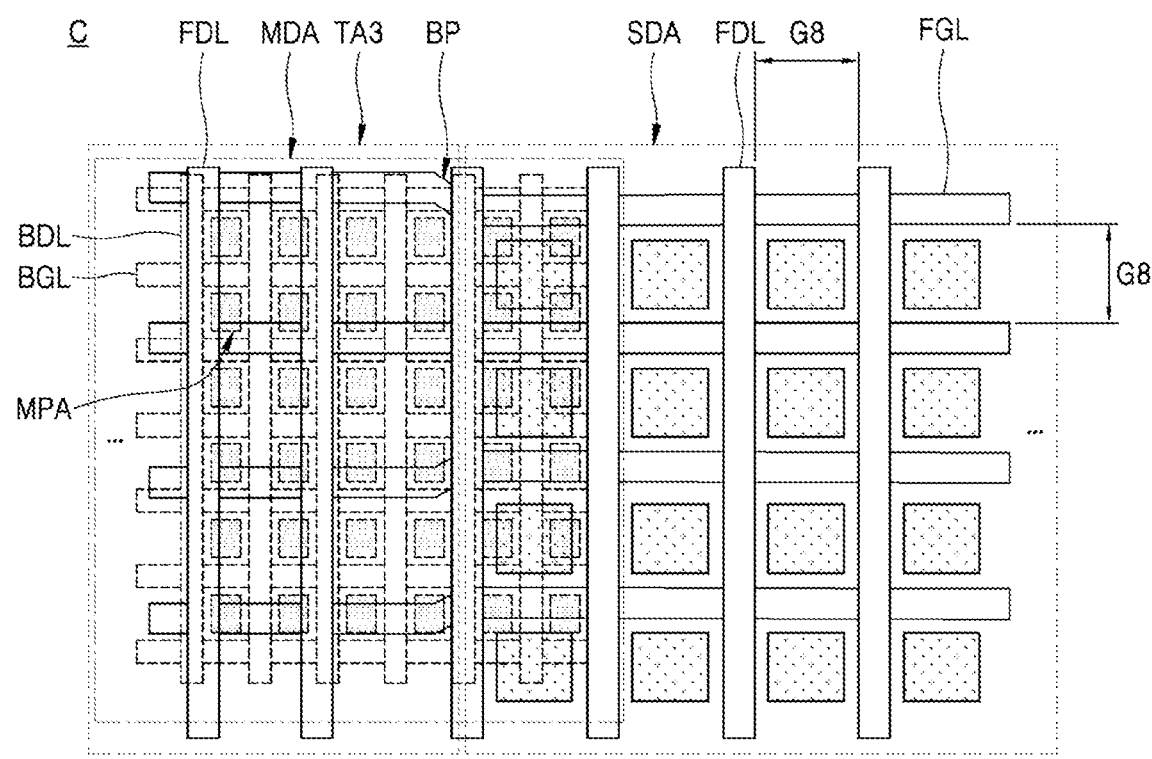

FIG. 9 is a drawing showing an example of the front display unit of FIG. 1. FIG. 10 is a drawing showing a portion of the front display unit corresponding to a portion D of FIG. 9. FIG. 11, FIG. 12, and FIG. 13 are drawings showing examples of a portion B in FIG. 6 and FIG. 9. FIGS. 14 and 15 are drawings showing examples of a portion C in FIGS. 6 and 9.

As shown in FIG. 9, the front display unit 120 is disposed on the plurality of segmented display units 110 (110-1, 110-2, 110-3, and 110-4 in FIG. 6), and has a size and a shape corresponding to those of a combination of the plurality of segmented display units 110 (110-1, 110-2, 110-3, and 110-4 in FIG. 6).

The front display unit 120 includes a plurality of transmission areas TA1, TA2, TA3, and TA4 respectively corresponding to the plurality of segmented display units 110 (110-1, 110-2, 110-3, and 110-4 of FIG. 6), and the supplementation display area SDA corresponding to the separation area between neighboring segmented display units among the plurality of segmented display units 110 (110-1, 110-2, 110-3, and 110-4 of FIG. 6).

In one example, when the display device 100 includes the first, second, third, and fourth segmented display units (110-1, 110-2, 110-3, and 110-4 in FIG. 6) arranged by 2×2, the front display unit 120 may include first, second, third and fourth transmission areas TA1, TA2, TA3, and TA4 arranged by 2×2 and respectively corresponding to the plurality of segmented display units 110 (110-1, 110-2, 110-3, and 110-4 of FIG. 6).

The supplementation display area SDA implements a resolution lower than each of the main display areas MDA of the plurality of segmented display units 110 (110-1, 110-2, 110-3, and 110-4 in FIG. 6) implements.

The front display unit 120 may further include a supplementation bezel area SBA disposed outside the plurality of transmission areas TA1, TA2, TA3, and TA4 and the supplementation display area SDA, and surrounding the plurality of transmission areas TA1, TA2, TA3, and TA4 and the supplementation display area SDA.

In one example, the supplementation bezel area SBA may have a width W equal to or larger than a width of the main bezel area MBA overlapping therewith.

As shown in FIG. 10, the front display unit 120 include a plurality of replacement pixel areas RPAs arranged in a matrix in the supplementation display area SDA.

In this connection, the supplementation display area SDA implements a lower resolution than the main display area MDA implements. Thus, each of the replacement pixel areas RPA arranged in the supplementation display area SDA has a larger size than that of each of the major pixel areas (MPA in FIG. 7) arranged in the main display area MDA of each of the segmented display units 110.

Further, the front display unit 120 include front signal lines FGL and FDL for supplying a drive signal to the plurality of replacement pixel areas RPAs. That is, the front display unit 120 includes a front gate line FGL supplying a scan signal (SCAN of FIG. 3) to the plurality of replacement pixel area RPAs; and a front data line FDL supplying a data signal (VDATA in FIG. 3) to the plurality of replacement pixel area RPAs.

The front signal lines FGL and FDL are not only disposed in the supplementation display area SDA, but are disposed in the supplementation display area SDA and all of the plurality of transmission areas TA1, TA2, TA3, and TA4.

That is, the front signal lines FGL and FDL may extend across at least two transmission areas TA1, TA2, TA3, and TA4 arranged in the same direction as the extension direction, and across the supplementation display area SDA between the transmission areas TA1, TA2, TA3, and TA4.

Referring to the example of FIG. 10, the front signal lines (for example, the front gate lines FGL) extending in the first direction may extend across the first and second transmission areas TA1 and TA2 arranged in the first direction, and the supplementation display area SDA therebetween. Alternatively, the front signal lines (for example, the front gate lines FGL) extending in the first direction may extend across the third and fourth transmission areas TA3 and TA4 and arranged in the first direction, and the supplementation display area SDA therebetween.

Referring to the example of FIG. 10, the front signal lines (for example, the front data lines FDL) extending in the second direction may extend across the first and third transmission areas TA1 and TA3 arranged in the second direction and the supplementation display area SDA therebetween. Alternatively, the front signal lines (for example, the front data lines FDL) extending in the second direction may extend across the second and fourth transmission areas TA2 and TA4 arranged in the second direction and the supplementation display area SDA therebetween.

However, according to one embodiment of the present disclosure, in order to prevent Moiré defect due to overlapping of the uniform patterns, the front signal lines FGL and FDL arranged in each of the plurality of transmission areas TA1, TA2, TA3, and TA4 may have an arrangement pattern different from that of the bottom signal lines BGL and BDL of the main display area MDA of each of the plurality of segmented display units 110 or may be may be arranged and spaced from each other by varying spacings.

As shown in FIG. 11, the spacings between the front signal lines FGL and FDL arranged in each of the transmission areas TA1, TA2, TA3, and TA4 may vary on a predefined length basis.

In one example, as shown in FIG. 11, a spacing between the front signal lines FGL may randomly vary and a spacing between the front signal lines FDL may randomly vary. However, this is just an example. Although not shown separately, a spacing between at least two front signal lines FGL and FDL may randomly vary.

That is, a spacing between front gate lines FGLs may randomly vary (G3 and G4). Further, a spacing between front data lines FDLs may randomly vary (G5 and G6).

Alternatively, as shown in FIGS. 12 and 13, each of the front signal lines FGL and FDL arranged in each of the transmission areas TA1, TA2, TA3, and TA4 may have a different shape from that of each of the bottom signal lines BGL and BDL.

That is, while each of the bottom signal lines BGL and BDL may extend in a straight line, each of the front signal lines FGL and FDL arranged in each of the transmission areas TA1, TA2, TA3, and TA4 may extend along a predetermined direction while being bent. For example, the front signal lines FGL and FDL arranged in each of the transmission areas TA1, TA2, TA3, and TA4 include a non-linear portion.

In one example, as shown in FIG. 12, at least one (FDL in FIG. 12) of the front signal lines FGL and FDL arranged in each of the transmission areas TA1, TA2, TA3, and TA4 has a shape in which a 'C'-shaped bent portion (or a trench-like portion) and a straight line are arranged with each other in an alternate manner.

In another example, as shown in FIG. 13, at least one (FGL of FIG. 13) of the front signal lines FGL and FDL arranged in each of the transmission areas TA1, TA2, TA3, and TA4 may extend in a zigzag manner.

In addition, although not shown separately, in each of the transmission areas TA1, TA2, TA3, and TA4, the front signal lines FGL and FDL including the bent portion, and the front signal lines FGL and FDL extending in a straight line are arranged in a matrix such that the front signal lines FGL and FDL may have an irregular arrangement pattern.

In this way, the front signal lines FGL and FDL do not have a regularly repeated arrangement pattern. Thus, Moiré phenomenon due to overlap between the front signal lines FGL and FDL and the bottom signal lines BGL and BDL may be prevented.

As shown in FIGS. 14 and 15, in the front display unit 120, the plurality of replacement pixel areas RPAs for emitting light for image display are disposed only in the supplementation display area SDA. That is, the replacement pixel areas RPA are not disposed in the plurality of transmission areas TA1, TA2, TA3, and TA4, but only the front signal lines FGL and FDL are disposed in the plurality of transmission areas TA1, TA2, TA3, and TA4.

That is, as the supplementation display area SDA is disposed between adjacent ones of the plurality of transmission areas TA1, TA2, TA3, and TA4, the front signal lines FGL and FDL for supplying the drive signal to the plurality of replacement pixel areas RPAs are disposed not only in the supplementation display area SDA but also in the plurality of transmission areas TA1, TA2, TA3, and TA4.

The front signal lines FGL and FDL may extend across at least one of the plurality of transmission areas TA1, TA2, TA3, and TA4 and the supplementation display area SDA.

Accordingly, as shown in FIG. 14, the front signal lines FGL and FDL may not have a regularly repeated arrangement pattern in the supplementation display area SDA as in the front signal lines FGL and FDL arranged in the plurality of transmission areas TA1, TA2, TA3, and TA4.

When the front signal lines FGL and FDL do not have a regularly repeated arrangement pattern but have varying spacings therebetween in the plurality of transmission areas TA1, TA2, TA3, and TA4 and the supplementation display area SDA to prevent the Moiré defect, the uniformity of the spacings between the replacement pixel areas RPA is lowered. As a result, color mixture characteristics of the light beams emitted from the adjacent replacement pixel areas RPA in one area may be different from that in another area. Thus, there is a limit to the improvement of the image quality in the supplementation display area SDA.

To overcome this limitation, as shown in FIG. 15, the front signal lines FGL and FDL may be arranged and spaced from each other by the same spacing G8 in the supplementation display area SDA, which is not the case for the front signal lines FGL and FDL randomly arranged in the plurality of transmission areas TA1, TA2, TA3, and TA4 in order to prevent Moiré defect.

Accordingly, in some embodiments, the front signal lines FGL and FDL may include a bent pattern BP at an edge of each of the transmission areas TA1, TA2, TA3, and TA4 adjacent to the supplementation display area SDA.

The supplementation display area SDA implements a lower resolution than the main display area MDA implements. Thus, each of the replacement pixel areas RPA arranged in the supplementation display area SDA has a larger size than a size of each of the major pixel areas MPA arranged in the main display area MDA of each of the segmented display units 110. For example, a pixel size in the main display area MDA may be smaller than the pixel size in the supplementation display area SDA thereby causing the resolution of the supplementation display area SDA to be relatively lower than the resolution of the main display area MDA.

In addition, as shown in FIGS. 14 and 15, an edge of the supplementation display area SDA may overlap a portion of the main display area MDA.

That is, each of the at least one replacement pixel area RPA disposed at the edge of the supplementation display area may overlap at least one major pixel area MPA.

In this way, a boundary between the supplementation display area SDA and the main display area MPA may be prevented from being easily recognized by the viewer.

As described above, the display device 100 according to one embodiment of the present disclosure includes the front display unit 120 disposed on the plurality of segmented display units 110 arranged in a matrix.

The front display unit 120 includes the plurality of transmission areas TA corresponding to the plurality of segmented display units 110, respectively, and the supplementation display area SDA corresponding to a boundary between two adjacent segmented display units 110 among the plurality of segmented display units 110.

Due to the front display unit 120, the boundaries between the plurality of segmented display units 110 may not be easily recognized by the user. Rather, the plurality of segmented display units 110 may act as a single integral display unit.

Accordingly, when the plurality of segmented display units 110 implement a high resolution, the display device 100 may overcome the limitations related to the line resistance and the image quality, and may realize both the large sized screen and the high resolution.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. The scope of the technical idea of the present disclosure is not limited by the embodiments. Therefore, it should be understood that the embodiments as described above are illustrative and non-limiting in all respects. All technical ideas within the scope of the present disclosure should be interpreted as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
a plurality of segmented display units each including a main display area and a main bezel area disposed outside the main display area and adjacent to the main display area; and
a front display unit including a plurality of transmission areas corresponding to each of the main display areas and a supplementation display area corresponding to a separation area between main display areas of adjacent segmented display units among the plurality of segmented display units,
wherein each of the plurality of segmented display units further includes a plurality of bottom signal lines extending across each main display area,
wherein the front display unit further include a plurality of front signal lines extending across the plurality of transmission areas and the supplementation display area,
wherein an arrangement pattern of a plurality of front signal lines in each transmission area is different from an arrangement pattern of a plurality of bottom signal lines in each main display area overlapping each transmission area,
wherein the front signal line includes a bent pattern at an edge of each of the plurality of the transmission areas adjacent to the supplementation display area,
wherein a spacing between two adjacent front signal lines in each of the plurality of transmission areas varies per a pair of two adjacent front signal lines,
wherein the front signal lines in the supplementation display area are spaced from each other by the same spacing.

2. The display device of claim 1, wherein a resolution achieved by the supplementation display area is different from a resolution achieved by the main display area,
wherein an edge of the supplementation display area overlaps a portion of the main display area.

3. The display device of claim 1, wherein the plurality of segmented display units are arranged in a matrix, and
wherein each of the plurality of segmented display units further includes a plurality of major pixel areas arranged in a matrix and disposed in each main display area, wherein each main display area implements a first resolution.

4. The display device of claim 3,
wherein the front display unit further include a plurality of replacement pixel areas arranged in a matrix and disposed in the supplementation display area, wherein the supplementation display area implements a second resolution lower than the first resolution,
wherein a size of each replacement pixel area is larger than a size of each major pixel area.

5. The display device of claim 1, wherein each of the plurality of segmented display units further includes a plurality of bottom signal lines extending across each main display area,
wherein the front display unit further include a plurality of front signal lines extending across the plurality of transmission areas and the supplementation display area.

6. The display device of claim 5, wherein at least one of the front signal lines arranged in each of the transmission areas has a shape in which a 'C'-shaped bent portion and a straight line are arranged with each other in an alternate manner,
wherein at least one of the front signal lines arranged in each of the transmission areas is extend in a zigzag manner, and
wherein in each of the transmission areas, the front signal lines including the bent portion, and the front signal lines extending in a straight line are arranged in a matrix.

7. The display device of claim 1, wherein the device further comprises an image processor configured to generate a plurality of divided image signals corresponding to the plurality of segmented display units and the front display unit, based on an external image signal.

8. The display device of claim 1, wherein the number of transmission areas is equal to the number of the segmented display units.

9. The display device of claim 1, wherein the front display unit disposed on the plurality of segmented display units, and
wherein the front display unit has a width corresponding to a width of a combination of the plurality of segmented display units.

10. The display device of claim 1, wherein an arrangement of the plurality of segmented display units are applied in a manner corresponding to planar shapes of the front display unit.

11. The display device of claim 1, wherein the supplementation display area emits light for image display, and covers the separation area between the main display areas of the segmented display units adjacent to each other among the plurality of segmented display units.

12. The display device of claim 1, wherein the plurality of transmission areas respectively overlap the main display areas of the plurality of segmented display units, and
wherein the plurality of light transmitting areas transmit light emitted from each of the main display areas.

13. The display device of claim 1,
each of the plurality of segmented display units display each of the divided images in each main display area thereof, and
the front display unit display an image corresponding to the gap between the divided images in the supplementation display area.

14. The display device of claim 1, wherein the separation area between the main display areas of the first and second segmented display units adjacent to each other is equal to a sum of a spacing between the first and second segmented display units and a width of the main bezel area of each of the first and second segmented display units.

15. The display device of claim 1, wherein the front display unit further including a supplementation bezel area disposed outside the plurality of transmission areas and the supplementation display area, and surrounding the plurality of transmission areas and the supplementation display area.

16. The display device of claim 15, wherein the supplementation bezel area overlaps the main bezel area.

17. The display device of claim 15, wherein the supplementation bezel area have a width equal to or larger than a width of the main bezel area.

18. A device comprising:
a plurality of display units, each of the display unit including a main display area and a main bezel area adjacent to the main display area, the main bezel area having a first dimension between the main display area and a main bezel area of an adjacent display unit in a first direction; and
a front display unit overlain on the plurality of display units, the front display unit including a plurality of transmission areas and a supplementation display area between the plurality of transmission areas, each of the transmission area overlapping each of the main display area and the supplementation display area overlapping the main bezel area between the main display areas of the plurality of display units,
wherein the transmission area of the front display unit is configured to transmit light emitted from the main display area of the plurality of display units, and
wherein the main display area includes a pixel having a first pixel size and the supplementation display area includes a pixel having a second pixel size greater than the first pixel size,
wherein an arrangement pattern of a plurality of front signal lines in each transmission area is different from an arrangement pattern of a plurality of bottom signal lines in each main display area overlapping each transmission area,
wherein the front signal line includes a bent pattern at an edge of each of the plurality of the transmission areas adjacent to the supplementation display area,
wherein a spacing between two adjacent front signal lines in each of the plurality of transmission areas varies per a pair of two adjacent front signal lines,
wherein the front signal lines in the supplementation display area are spaced from each other by the same spacing.

19. The device according to claim 18, further comprising:
a plurality of first signal lines arranged along the first direction in the plurality of display units, adjacent first signal lines having a first spacing between each other and another adjacent first signal lines having a second spacing between each other;
a plurality of second signal lines arranged along a second direction transverse to the first direction in the plurality of display units, adjacent second signal lines having a third spacing between each other and another adjacent second signal lines having a fourth spacing between each other;
a plurality of third signal lines arranged along the first direction in the front display unit, adjacent third signal lines having a fifth spacing between each other and another adjacent third signal lines having a sixth spacing between each other; and
a plurality of fourth signal lines arranged along the second direction in the front display unit, adjacent fourth signal lines having a seventh spacing between each other and another adjacent fourth signal lines having an eighth spacing between each other,
wherein the first spacing and the second spacing are different from each other and the third spacing and the fourth spacing are different from each other, and
wherein the fifth spacing and the sixth spacing are different from each other and the seventh spacing and the eight spacing are different from each other.

* * * * *